DETENT SPRING

Filed March 17, 1967

INVENTORS
NORMAN D. CAPPELLE
JOHN G. CUMMINGS
BY Hofgren, Wegner, Allen, Stellman & McCord
ATTORNEYS.

United States Patent Office 3,489,029
Patented Jan. 13, 1970

3,489,029
DETENT SPRING
Norman D. Cappelle, Arlington Heights, and John G. Cummings, Cary, Ill., assignors to Oak Electro/Netics Corp., a corporation of Delaware Filed Mar. 17, 1967, Ser. No. 623,853
Int. Cl. G05g *5/06*
U.S. Cl. 74—527 5 Claims

ABSTRACT OF THE DISCLOSURE

The tuner chassis has a planar front wall with an opening through which a rotatable shaft extends generally perpendicular to the wall. An indexing wheel is secured to the shaft in a plane substantially parallel and flush with the chassis front wall and has a plurality of peripheral detent portions. A single resilient wire index spring is mounted solely on the front wall and bears against the detent portions of the index wheel to provide indexing of the control shaft with respect to the chassis. The wire spring includes a first leg mounted on the front wall and a second leg extending angularly from the first leg generally tangentially of and bearing against the index wheel, the first and second legs being disposed substantially in the plane of the index wheel. The wire spring is anchored to the chassis front wall at the juncture of the first and second legs to establish a pivot point for the second leg. The anchoring means comprises a tab stamped out of the front wall. The tab extends through a spring loop at the juncture of the first and second legs of the wire spring. The tab may be bent to change the position of the juncture of the spring legs and thereby adjust the pivot point of the second leg to compensate for irregularities of associated mechanism.

BACKGROUND OF THE INVENTION

A switch type tuner commonly used today in television receiving apparatus and the like includes a number of switch wafers which are employed for the various amplifier, mixer and oscillator portions of the tuner. Each of the switch wafers comprises a rotor and a stator, the stator carrying a number of stationary contacts between which are connected incremental inductances which may be selectively connected into the various portions of the tuner by means of the rotor switch contacts. The rotor is operated by a control shaft which extends through the series of switch wafers and through the front wall of the tuner chassis for manual operation. The positioning of the rotor switch contacts in relation to the stationary contacts on the stators are normally governed by an indexing mechanism which indexes the control shaft in relation to the tuner chassis to facilitate accurate positioning of the shaft in each of the channel selecting positions of the tuner.

Heretofore, one type of indexing mechanism comprised a spring biased detent ball which engaged notches or scallops in an index disc to retain the index disc and the associated rotor elements in the desired indexing position. Such structures can be seen with reference to the patents to Cappelle 3,096,665 and Lewandowski 3,293,382. Furthermore, such ball constructions are preset mechanisms and are extremely difficult if not impossible to adjust to compensate for variances in the position of the selector shaft caused by manufacturing tolerances.

Another type of index mechanism is a torsion bar spring as shown in the patent to Valdettaro 3,234,801. The torsion bar spring has a portion extending parallel to the selector shaft and an end portion extending generally perpendicular to the first portion for bearing against an index wheel to provide indexing of the shaft with respect to the chassis. That portion of the torsion bar spring which extends parallel to the selector shaft is either anchored to the chassis and/or one of the stator wafers or has a leg portion which engages the selector shaft as shown in the Valdettaro patent. Such torsion bar constructions result in a twisting action on the chassis, and this is highly undesirable for switch type tuners. Even a slight change in the position of the switch rotor contacts in relation to the stator contacts may result in a different incremental inductance between positions which will affect the resonant frequency and band width of the tuner. In addition, the inner end leg of the torsion bar which bears on the selector shaft causes friction and any such frictional force detracts from the detent action of the indexing mechanism and further affects the critical positioning of the switches.

SUMMARY OF THE INVENTION

The principal object of the present invention is to provide a new and improved index mechanism particularly for a tuner used in radio and television receiving apparatus.

Another object of this invention is to provide an indexing mechanism including a single resilient index member mounted solely on one wall portion of the tuner chassis to eliminate undue stresses on the chassis and avoid adverse effects on the switch portions of the tuner.

A further object of the invention is to provide an indexing mechanism wherein the forces of the index spring are confined to a single wall of the tuner chassis and an index wheel secured to the selector shaft of the tuner.

Still another object of this invention is to provide an indexing mechanism which is adjustable to compensate for variances in the associated parts of the tuner due to manufacturing tolerances.

DETAILED DESCRIPTION OF THE INVENTION

Figures 1, 2, 3, 4, 5:
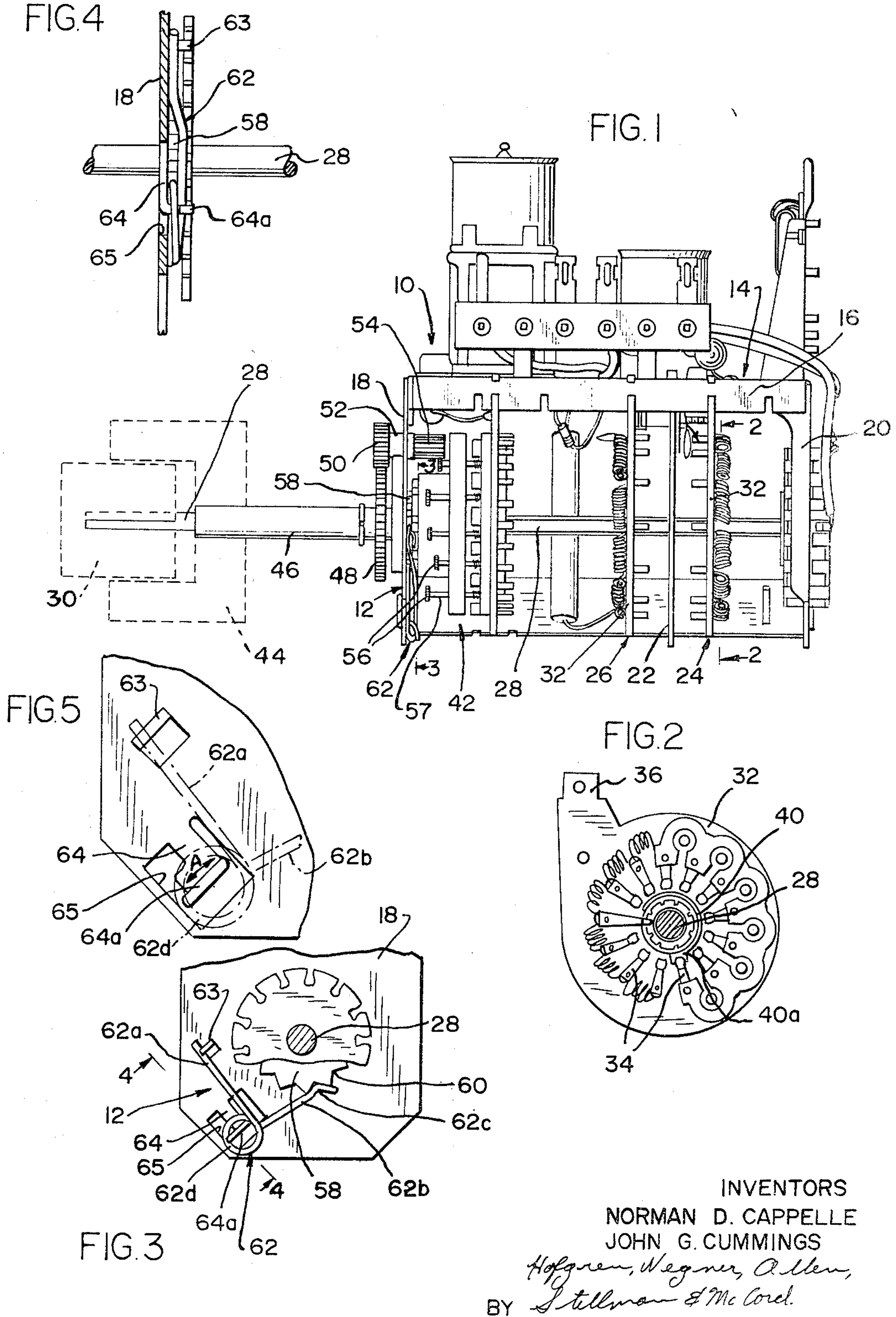
FIG. 1 is an elevation view of a tuner including the improved indexing mechanism with a portion of the tuner cover removed.
FIG. 2 is a partial sectional view taken generally along the line 2—2 of FIG. 1 illustrating the stator and rotor of one of the switch wafers of the tuner.
FIG. 3 is a partial sectional view taken generally along the line 3—3 of FIG. 1 illustrating the indexing mechanism of this invention.
FIG. 4 is a sectional view taken generally along the line 4—4 of FIG. 3.
FIG. 5 is a partial elevation view of FIG. 3 showing on an enlarged scale the means for securing the wire spring to the chassis front wall.

Referring now to the drawings, there is illustrated in FIG. 1 a television tuner generally designated 10 having an indexing mechanism generally designated 12. The tuner includes a chassis 14 of a generally U-shape and having a bight portion 16 and a pair of upstanding end walls 18 and 20, wall 18 being the front panel of the chassis. A removable shield, not illustrated in the drawings, normally encloses the open sides and bottom of the chassis 14. A center shield partition 22 divides the tuner, and switch wafers, generally designated 24 and 26, are positioned on the right and the left sides thereof, respectively. A control or selector shaft 28, having a selector knob 30 on its front end, is mounted by appropriate bearing means in the chassis end walls 18 and 20 for rotation relative to the chassis. Shield 22 is sometimes used as a bearing also.

Each of the switch wafers 24 and 26 includes a fixed outer stator portion 32 (FIG. 2) to which are secured a plurality of stator contacts 34. The stator portion 32 of each switch wafer is provided with a projection 36 which anchors stators into slots of chassis 14. An annular rotor 40 (FIG. 2) is supported within the center opening of each stator member 32 and rotates with shaft 28 relative to stators. The rotors each have a contact blade **40*a* extending outwardly therefrom. The rotor blade is adapted to engage successive ones of the inwardly directed blade type end portions of the stator contacts 34 as the rotor is rotated in order to provide for alignment of the tuner to individual television channels in a known manner. The indexing means 12 of this invention positions shaft 28 so that rotor blade 40*a* successively engages one of the stator contacts 34** and thereby provides appropriate incremental inductances for the circuits of the tuner.

A rotary disc, generally designated 42 (FIG. 1), is provided with tuning components such as inductors, not shown, for each of the selected channels. The structure is of the type shown in the patent to Ma, 3,254,539 which allows channels to be changed without altering the fine tuning setting of the channels and includes a fine tuning knob 44 secured to a sleeve type fine tuning shaft 46 which operates through a drive gear 48, a pinion 50 fixedly secured to one end of a gear shaft 52 having an elongated gear 54 at the other end thereof, which meshes with gear heads 56 of fine tuning adjusting screws 57 corresponding to each selected channel. The adjusting screw 57, in a known manner, operates the fine tuning inductors and capacitors for each of the channels selected by rotation of selector shaft 28.

The indexing means of this invention is best illustrated in FIG. 3 and includes an index wheel 58 secured to selector shaft 28 in a plane substantially parallel and flush with the chassis front wall 18 and has a plurality of detent valleys 60 positioned about the perimeter thereof. A single resilient wire index spring, generally designated 62, is mounted on the chassis front wall 18 and bears against the index wheel 58 to provide indexing of the control or selector shaft 28 with respect to the chassis 14 and the switch wafers 24 fixed to the chassis divider partition 22. The wire spring 62 includes a first leg **62*a* mounted on the chassis front wall 18 by a finger 63, FIGS. 4 and 5, and a second leg 62*b* extending angularly from the first leg. The second leg 62*b* has a lip portion 62*c* which bears against the index wheel 58 and seats in the detent valleys 60 to define the channel positions for the selector shaft 28. The springs legs 62*a*, 62*b* are disposed substantially in the plane of the index wheel and the spring is provided with a spring loop 62*d* at the juncture of the legs 62*a*, 62*b*. Referring particularly to FIGS. 4 and 5, a portion of the metal is stamped from the chassis front wall leaving a leg 64 disposed in the plane of the front wall and surrounded by an aperture 65. A foot or tab 64*a* is formed on the end of leg 64 and extends inwardly through the spring loop 62*d* to anchor the spring at the juncture of the spring leg 62*a*, 62*b* and establish a pivot point for the spring leg 62*b* which bears against the index wheel 58. Since the chassis front wall 18 is preferably made of metallic material, the anchoring tab 64*a* may be bent in the direction of arrows A, FIG. 5, to vary the pivot point for the spring leg 62*b* and moving the lip portion 62*c* of leg 62*b* tangentially to index wheel 58 varying the angular positions of the detent valleys 60. Such an adjusting feature permits compensation for variances due to manufacturing tolerances of the various parts. This is quite important because a slightly different position of the switch rotor fixed to the selector shaft 28 in relation to the stator contacts 34** may provide a different tuning inductance which will affect the resonant frequency and band width of the tuner.

The foregoing detailed description has been given for clearness of understanding only and no unnecessary limitations should be understood therefrom as some modifications will be obvious to those skilled in the art.

We claim:

1. In a tuner, the combination of a chassis having a wall portion containing an opening through which a rotatable control shaft extends generally perpendicular to said wall portion, an index wheel secured to said shaft and having a plurality of detent portions, a resilient index spring member mounted on a generally planar portion of said chassis wall portion and bearing against the detent portions of said index wheel to provide indexing of said shaft with respect to said chassis, and means for anchoring said spring member to said chassis wall portion, said means being adjustable to move the spring member in a direction generally the same as the direction of movement of the index wheel at the point or points of contact with the index spring to vary the rest positions of said detent portions relative to said chassis and to permit said adjustment without interference from or deforming said planar portion of the chassis wall portion.

2. The combination of claim 1 wherein said detent portions are positioned about the perimeter of said index wheel and said anchoring means is adjustable in a direction generally tangential to said index wheel to vary the angular positions of said detent portions relative to said chassis.

3. In a tuner, the combination of a chassis having a wall portion containing an opening through which a rotatable control shaft extends generally perpendicular to said wall portion, an index wheel secured to said shaft in a plane substantially parallel and flush with said chassis wall portion and having a plurality of detent portions, a resilient index spring member mounted solely on said chassis wall portion and bearing against the detent portions of said index wheel to provide indexing of said shaft with respect to said chassis, said spring member including a first leg on said chassis wall portion and a second leg extending angularly from said first leg and bearing against said index wheel, said first and second legs being disposed substantially in the plane of said index wheel, and means for anchoring said spring member to said chassis wall portion at the juncture of said first and second legs to establish a pivot point for said second leg, said anchoring means being adjustable to move the spring member in a direction to vary the rest positions of said detent portions relative to said chassis.

4. In a tuner, the combination of a chassis having a wall portion containing an opening through which a rotatable control shaft extends generally perpendicular to said wall portion, an index wheel secured to said shaft and having a plurality of detent portions, a resilient index spring member mounted on a generally planar portion of said chassis wall portion and bearing against the detent portions of said index wheel to provide indexing of said shaft with respect to said chassis, and means for anchoring said spring member to said chassis wall portion, said means being adjustable to move the spring member in a direction to vary the rest positions of said detent portions relative to said chassis, said anchoring means being stamped out of a generally planar portion of said chassis wall portion with an opening in the planar portion about a greater part of said anchoring means to permit adjustment of the anchoring means without interference from or deforming the planar portion of the chassis wall portion when adjusting said index spring member.

5. The combination of claim 4 wherein said anchoring means comprises a body portion extending into said opening generally in the plane of said planar portion and an arm portion extending generally perpendicular thereto for anchoring said spring member.

(References on following page)

References Cited

UNITED STATES PATENTS

| | | | |
|---|---|---|---|
| Re. 16,140 | 8/1925 | Erickson | 74—527 X |
| 1,038,567 | 9/1912 | Greengard. | |
| 2,153,430 | 4/1939 | Newman | 74—527 |
| 2,355,457 | 8/1944 | Mares | 74—527 |
| 3,192,329 | 6/1965 | Murrlé. | |
| 3,254,539 | 6/1966 | Ma | 74—10 |
| 3,283,105 | 11/1966 | Locke et al. | |

FOREIGN PATENTS

| | | |
|---|---|---|
| 70,450 | 5/1946 | Norway. |
| 143,497 | 1/1931 | Switzerland. |
| 1,267,143 | 6/1961 | France. |

FRED C. MATTERN, Jr., Primary Examiner

C. F. GREEN, Assistant Examiner

U.S. Cl. X.R.

74—10.41